US011664733B2

(12) United States Patent
Tsou et al.

(10) Patent No.: US 11,664,733 B2
(45) Date of Patent: May 30, 2023

(54) CONTROL METHOD OF A FLYBACK POWER CONVERTER

(71) Applicant: Leadtrend Technology Corp., Hsinchu County (TW)

(72) Inventors: Ming-Chang Tsou, Hsinchu County (TW); Hung-Ting Hsu, Hsinchu County (TW); Ya-Fu Huang, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 58 days.

(21) Appl. No.: 17/537,522

(22) Filed: Nov. 30, 2021

(65) Prior Publication Data

US 2022/0329160 A1    Oct. 13, 2022

Related U.S. Application Data

(60) Provisional application No. 63/172,101, filed on Apr. 8, 2021.

(51) Int. Cl.
*H02M 3/24*    (2006.01)
(52) U.S. Cl.
CPC ..................... *H02M 3/24* (2013.01)

(58) Field of Classification Search
CPC ........ H02M 3/24; H02M 3/26; H02M 3/3155; H02M 3/315; H02M 3/33507; H02M 3/33515; H02M 3/33523; H02M 3/33592
See application file for complete search history.

(56) References Cited

U.S. PATENT DOCUMENTS

| 2013/0148385 A1* | 6/2013 | Zhang | H02M 3/33592 363/21.12 |
| 2016/0261201 A1* | 9/2016 | Tao | H02M 3/33523 |
| 2022/0209676 A1* | 6/2022 | Li | H02M 3/01 |

* cited by examiner

*Primary Examiner* — Nguyen Tran
(74) *Attorney, Agent, or Firm* — Winston Hsu (57) ABSTRACT

A control method of a flyback power converter includes a voltage detection pin detecting conduction time of a power switch of a primary side of the flyback power converter, a feedback pin detecting conduction time of a synchronous switch of a secondary side of the flyback power converter, the feedback pin detecting a number of inductor capacitor resonant valleys when the flyback power converter operates in a discontinuous conduction mode, and a high voltage detection pin detecting an input voltage inputted in the flyback power converter; and a controller applied to the flyback power converter making the flyback power converter operate in a quasi-resonant mode when the number of the inductor capacitor resonant valleys is greater than a predetermined number, an operational frequency of the flyback power converter is less than a predetermined frequency, and the input voltage is less than a predetermined voltage.

7 Claims, 10 Drawing Sheets

CONTROL METHOD OF A FLYBACK POWER CONVERTER

CROSS REFERENCE TO RELATED APPLICATIONS

This application claims the benefit of U.S. Provisional Application No. 63/172,101, filed on Apr. 8, 2021 and entitled "Control method of flyback with QR/ZVS mode", the contents of which are incorporated herein by reference.

BACKGROUND OF THE INVENTION

1. Field of the Invention

The present invention relates to a control method of a flyback power converter, and particularly to a control method that can control the flyback power converter to switch between a quasi-resonant mode and a zero voltage switching mode to make efficiency of the flyback power converter be better.

2. Description of the Prior Art

In the prior art, when a flyback power converter is designed to operate in a zero voltage switching mode, the flyback power converter has an advantage of switching loss of a power switch applied to a primary side of the flyback power converter approaching zero. Although the flyback power converter has the advantage of the switching loss of the power switch approaching zero, efficiency of the flyback power converter operating in the zero voltage switching mode becomes worsened when an input voltage inputted in the flyback power converter is lower than a predetermined voltage or a load coupled to a secondary side of the flyback power converter is light. Meanwhile if the flyback power converter is switched to operate in a quasi-resonant mode from the zero voltage switching mode, the efficiency of the flyback power converter will become better. Because the flyback power converter provided by the prior art cannot determine to operate in the zero voltage switching mode or the quasi-resonant mode according to the input voltage and the load, that the efficiency of the flyback power converter is maintained at the best is not sure. Therefore, how to design the flyback power converter that can determine to operate in the zero voltage switching mode or the quasi-resonant mode according to the input voltage and the load has become an important issue.

SUMMARY OF THE INVENTION

An embodiment of the present invention provides a control method of a flyback power converter. The control method includes a voltage detection pin detecting conduction time of a power switch of a primary side of the flyback power converter, a feedback pin detecting conduction time of a synchronous switch of a secondary side of the flyback power converter, the feedback pin detecting a number of inductor capacitor resonant valleys when the flyback power converter operates in a discontinuous conduction mode (DCM), and a high voltage detection pin detecting an input voltage inputted in the flyback power converter; and a controller applied to the flyback power converter making the flyback power converter operate in a quasi-resonant mode when the number of the inductor capacitor resonant valleys is greater than a predetermined number, an operational frequency of the flyback power converter is less than a predetermined frequency, and the input voltage is less than a predetermined voltage.

The present invention provides a control method of a flyback power converter. The control method controls the flyback power converter to switch between a quasi-resonant mode and a zero voltage switching mode according to conduction time of a power switch of a primary side of the flyback power converter detected by a voltage detection pin of a primary side controller, conduction time of a synchronous switch of a secondary side of the flyback power converter detected by a feedback pin of the primary side controller, a number of inductor capacitor resonant valleys detected by a feedback pin of the primary side controller when the flyback power converter operates in the discontinuous conduction mode, and an input voltage inputted in the flyback power converter detected by a high voltage detection pin of the primary side controller. Therefore, compared to the prior art, because the present invention can control the flyback power converter to switch between the quasi-resonant mode and the zero voltage switching mode, the present invention can make efficiency of the flyback power converter be better These and other objectives of the present invention will no doubt become obvious to those of ordinary skill in the art after reading the following detailed description of the preferred embodiment that is illustrated in the various figures and drawings.

DETAILED DESCRIPTION

Figure 1:
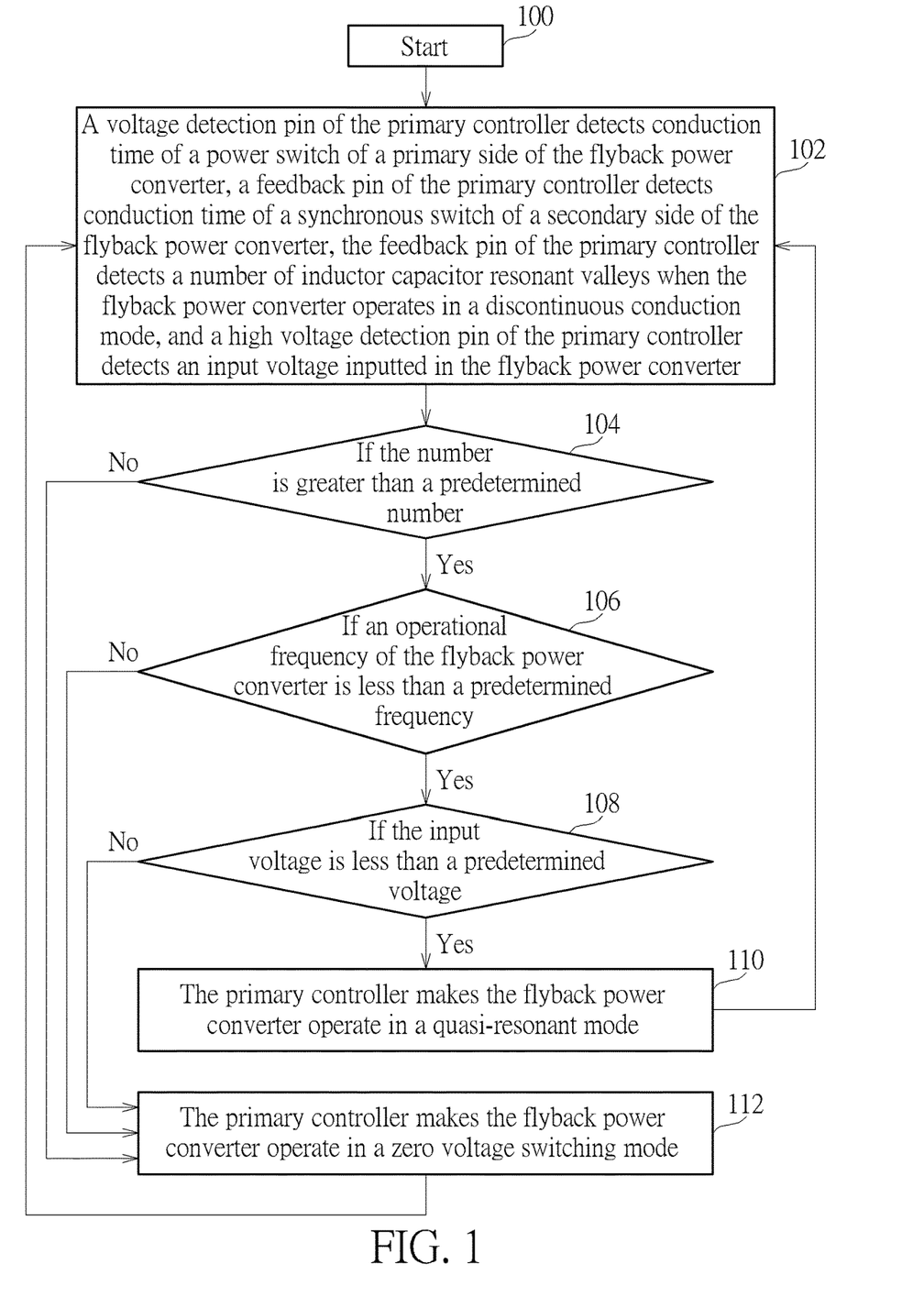
FIG. 1 is a flowchart illustrating a control method of a flyback power converter according to a first embodiment of the present invention.

Please refer to FIG. 1. FIG. 1 is a flowchart illustrating a control method of a flyback power converter according to a first embodiment of the present invention, wherein the control method in FIG. 1 is illustrated using a flyback power converter 200, a primary controller 202, and a secondary controller 204 in FIG. 2. Detailed steps are as follows:

Step 100: Start.

Figure 2:
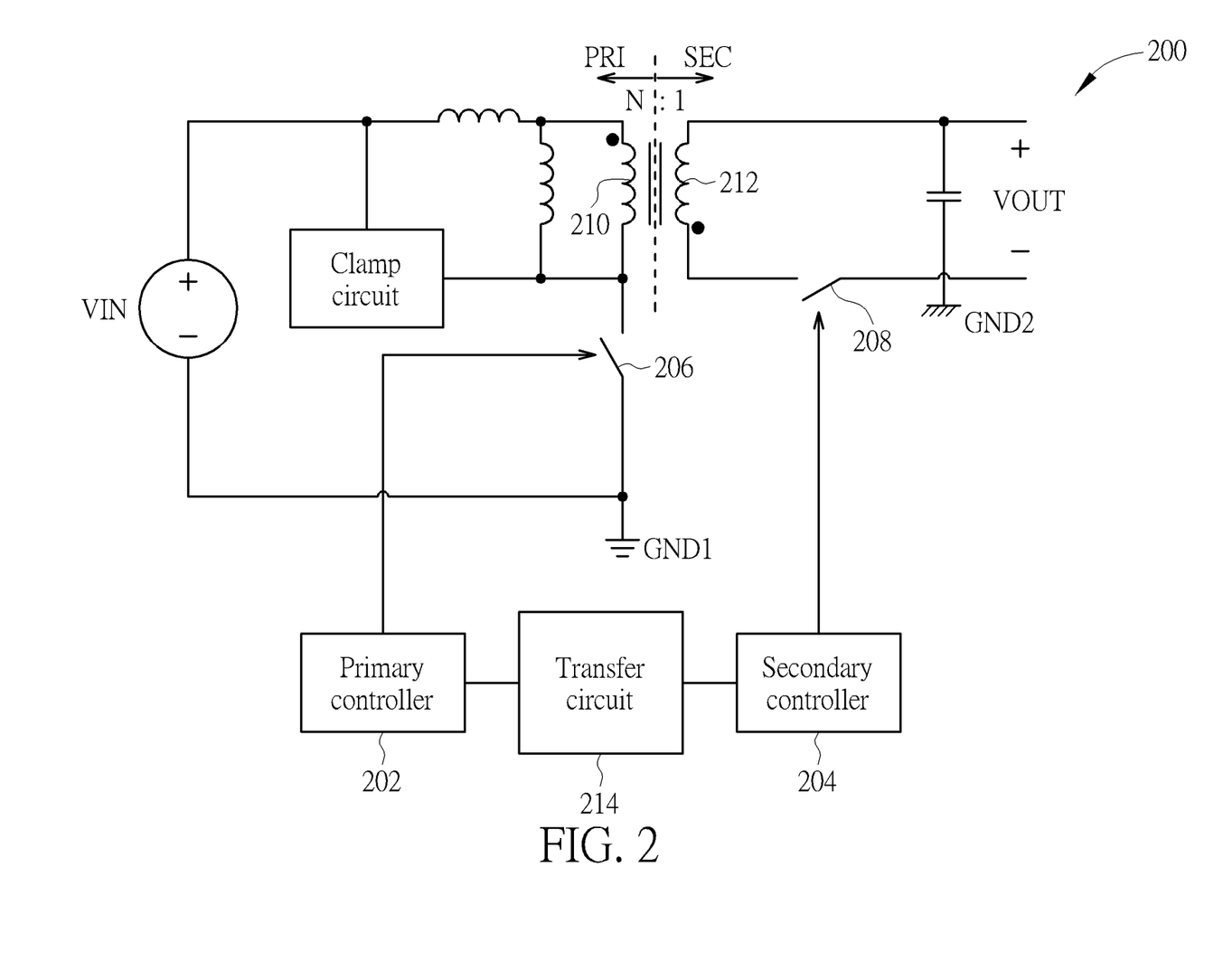
FIG. 2 is a diagram illustrating the flyback power converter, the primary controller, and the secondary controller.

Step 102: A voltage detection pin of the primary controller 202 detects conduction time TON of a power switch 206 of a primary side PRI of the flyback power converter 200, a feedback pin of the primary controller 202 detects conduction time TDIS of a synchronous switch 208 of a secondary side SEC of the flyback power converter 200, the feedback pin of the primary controller 202 detects a number LCRVN of inductor capacitor resonant valleys when the flyback power converter 200 operates in a discontinuous conduction mode (DCM), and a high voltage detection pin of the primary controller 202 detects an input voltage VIN inputted in the flyback power converter 200.

Step 104: If the number LCRVN is greater than a predetermined number; if yes, go to Step 106; if no, go to Step 112.

Step 106: If an operational frequency of the flyback power converter 200 is less than a predetermined frequency PF, if yes, go to Step 108; if no, go to Step 112.

Step 108: If the input voltage VIN is less than a predetermined voltage PV, if yes, go to Step 110; if no, go to Step 112.

Step 110: The primary controller 202 makes the flyback power converter 200 operate in a quasi-resonant mode, go to Step 102.

Step 112: The primary controller 202 makes the flyback power converter 200 operate in a zero voltage switching mode, go to Step 102.

Figure 6:
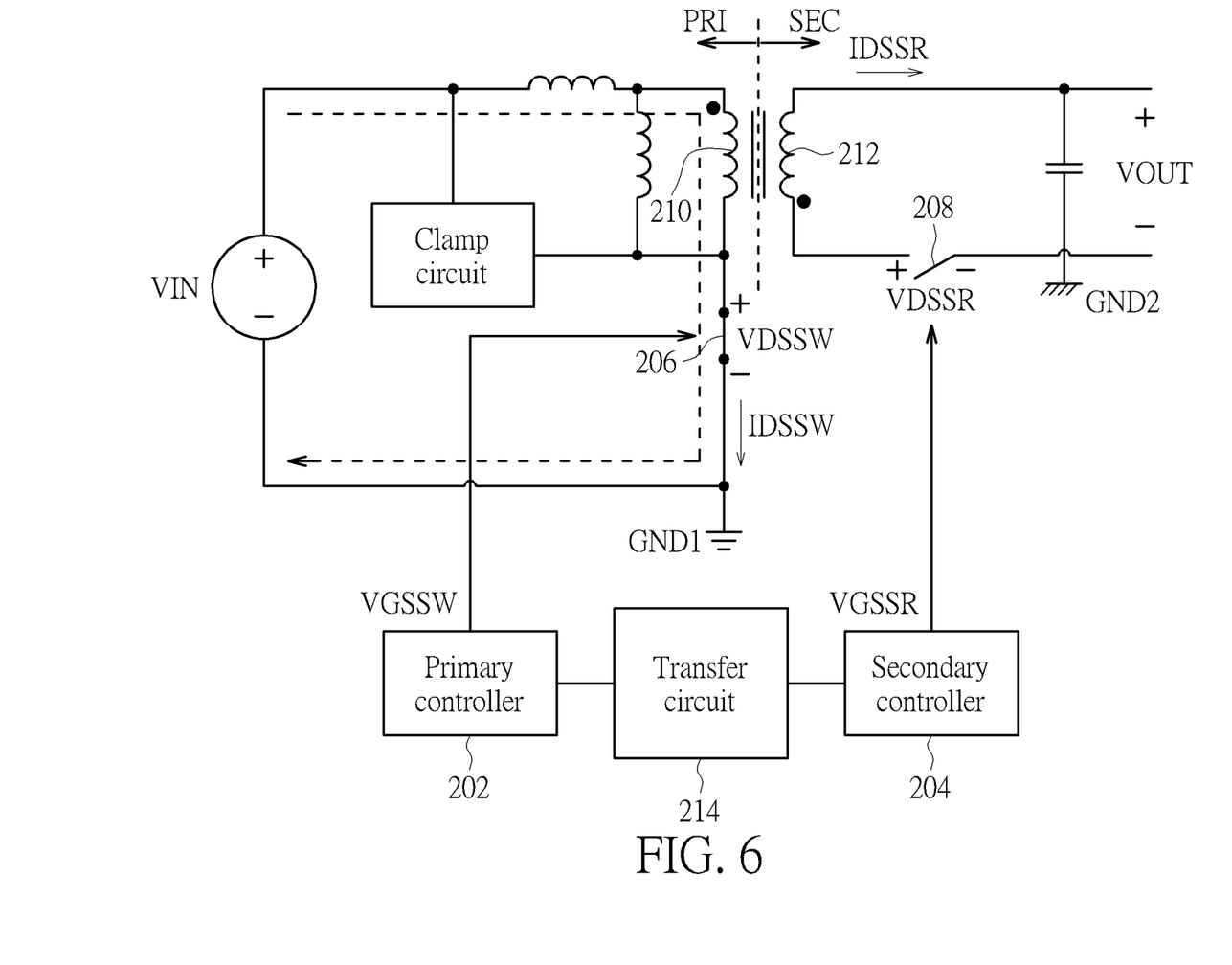
Figure 7:
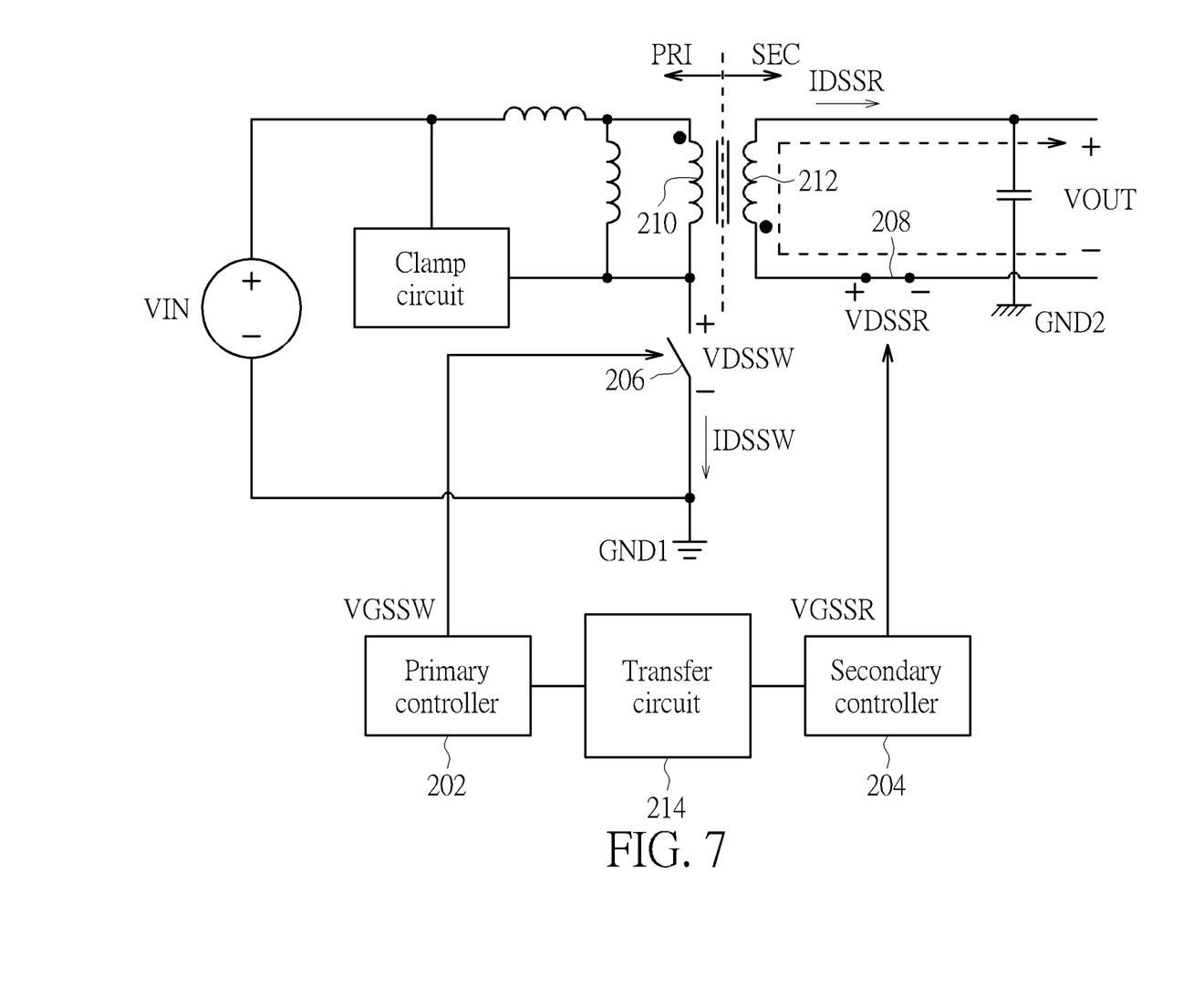
Figure 8:
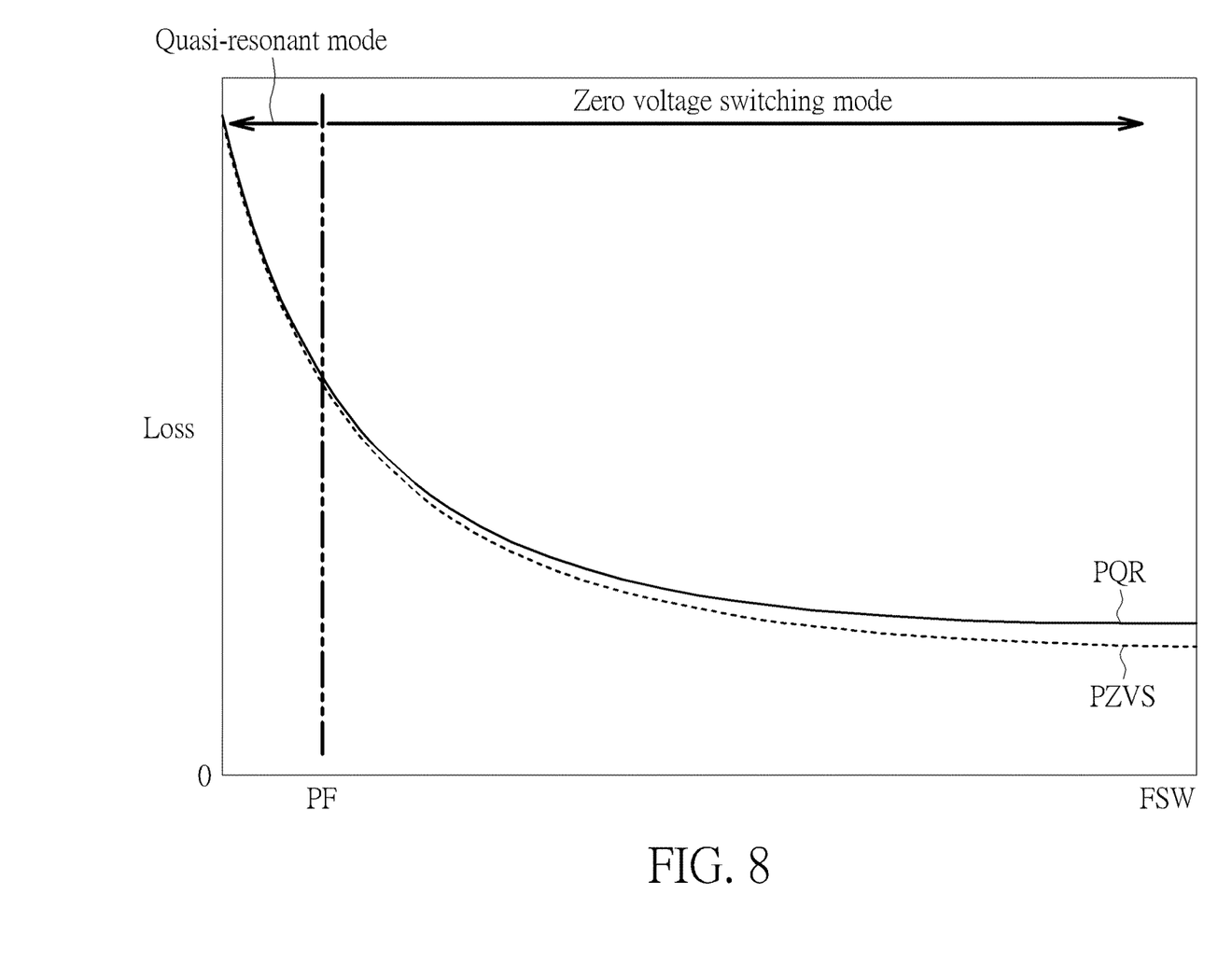
FIG. 8 is a diagram illustrating loss of the flyback power converter corresponding to the zero voltage switching mode versus loss of the flyback power converter corresponding to the quasi-resonant mode when the flyback power converter operates in different frequencies.
Figure 9:
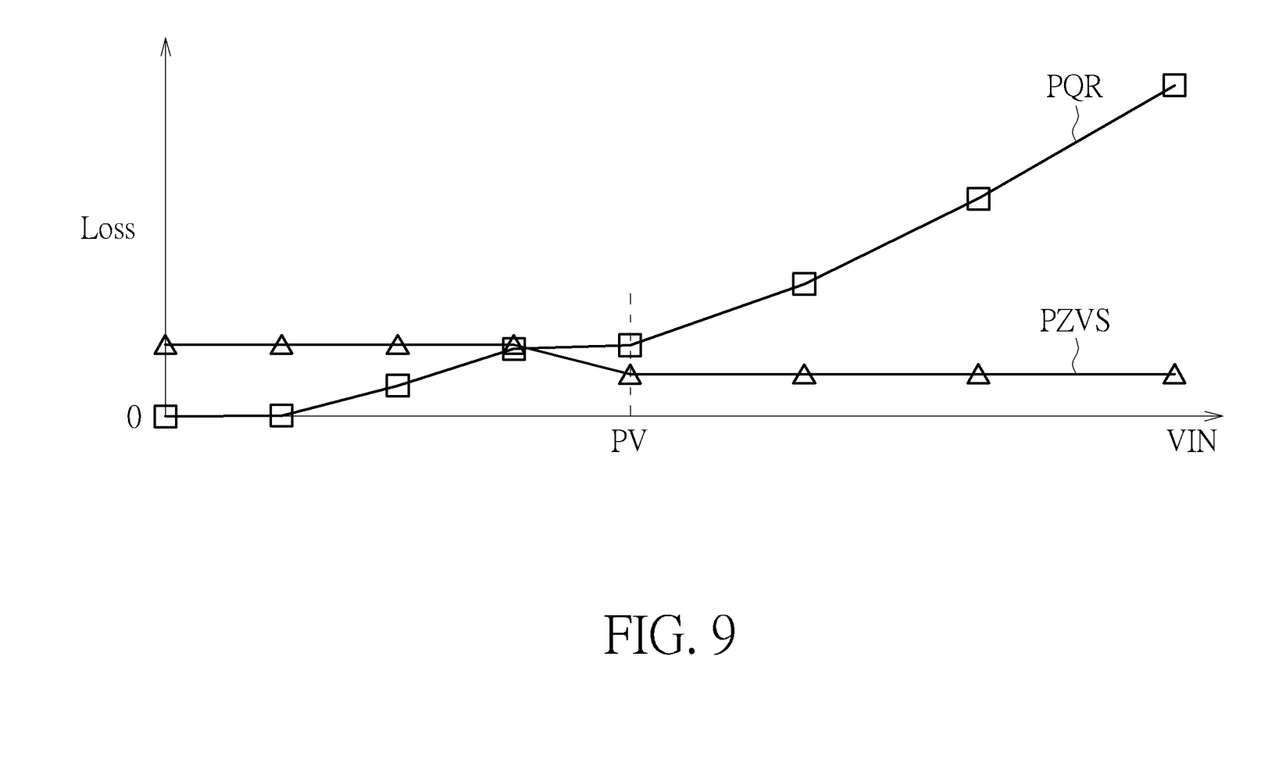
FIG. 9 is a diagram illustrating loss of the flyback power converter corresponding to the zero voltage switching mode versus loss of the flyback power converter corresponding to the quasi-resonant mode when the flyback power converter operates in different input voltages.

Before describing the control method in FIG. 1, please first refer to FIGS. 3-9, wherein FIGS. 3-7 are diagrams illustrating the flyback power converter 200 operating in the zero voltage switching mode, FIG. 8 is a diagram illustrating loss PZVS of the flyback power converter 200 corresponding to the zero voltage switching mode versus loss PQR of the flyback power converter 200 corresponding to the quasi-resonant mode when the flyback power converter 200 operates in different frequencies, and FIG. 9 is a diagram illustrating loss PZVS of the flyback power converter 200 corresponding to the zero voltage switching mode versus loss PQR of the flyback power converter 200 corresponding to the quasi-resonant mode when the flyback power converter 200 operates in different input voltages. In addition, as shown in FIG. 2, the flyback power converter 200 is a secondary side regulation flyback power converter, a turns ratio of a primary side winding 210 of the flyback power converter 200 to a secondary side winding 212 of the flyback power converter 200 is N, N is a real number, the primary controller 202 communicates with the secondary controller 204 through a transfer circuit 214, the transfer circuit 214 isolates the primary side PRI of the flyback power converter 200 from the secondary side SEC of the flyback power converter 200, and potential GND1 of the primary side PRI of the flyback power converter 200 is different from potential GND2 of the secondary side SEC of the flyback power converter 200. In addition, the primary controller 202 has 6 pins (not shown in FIG. 2), wherein the 6 pins includes the voltage detection pin, the feedback pin, the high voltage detection pin, a supply voltage pin, a gate control signal pin, and a ground pin, the supply voltage pin is used for receiving a supply voltage, and the gate control signal pin is used for outputting a gate control signal generated by the primary controller 202 to the power switch 206.

Figure 3:
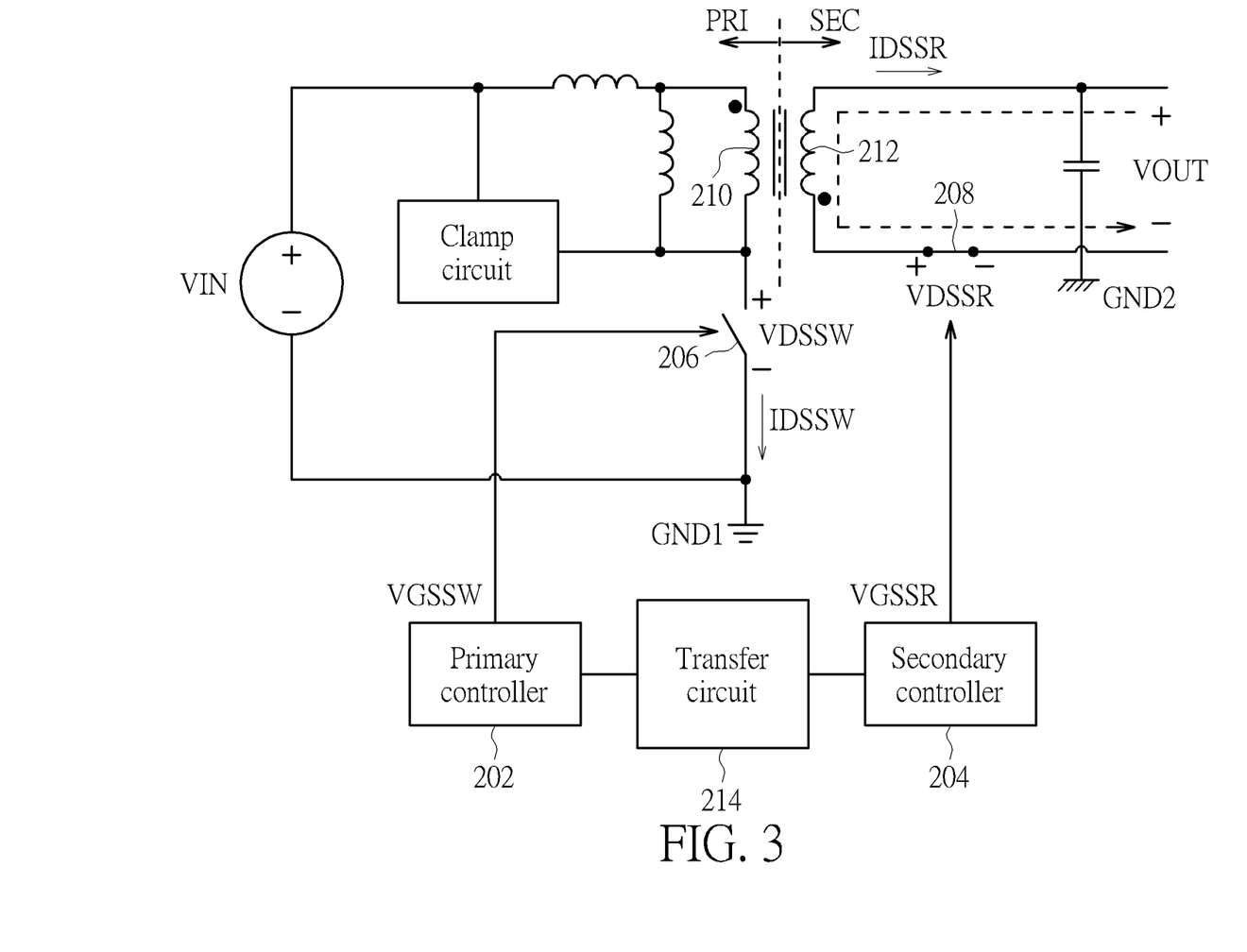
FIGS. 3-7 are diagrams illustrating the flyback power converter operating in the zero voltage switching mode.
Figure 4:
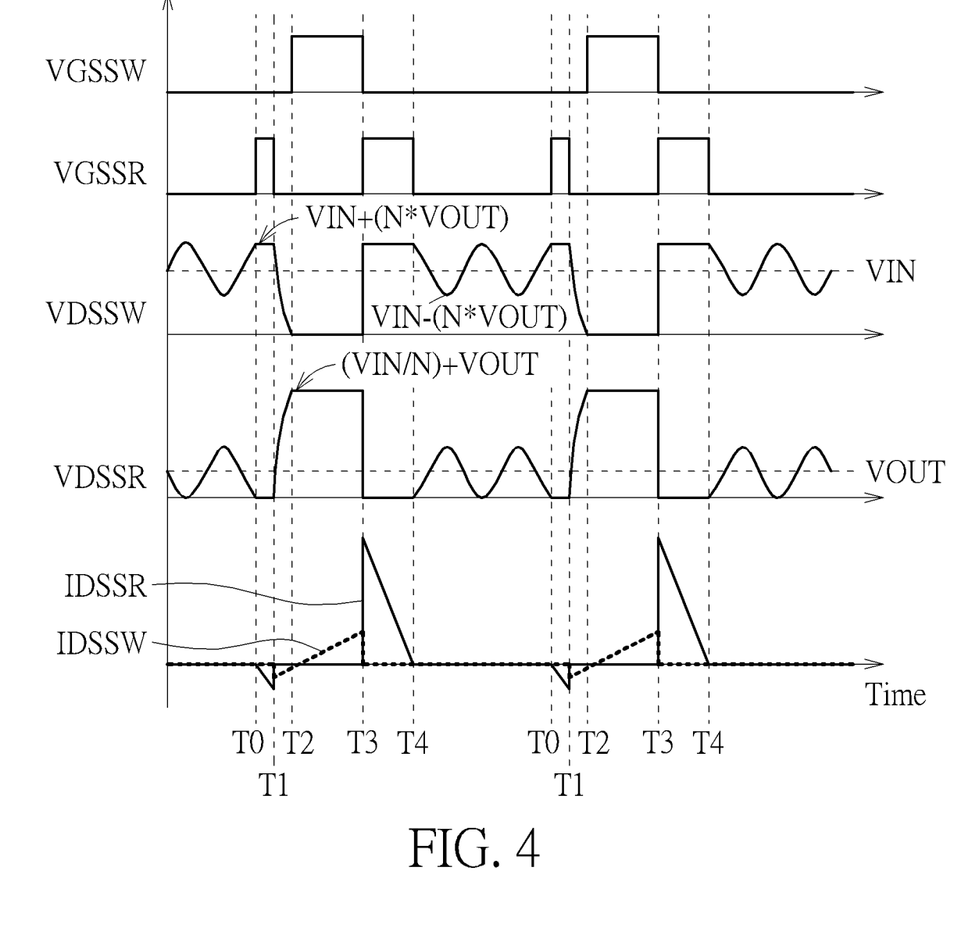

As shown in FIGS. 3, 4, between a time T0 and a time T1, because the secondary controller 204 enables a gate control signal VGSSR to the synchronous switch 208, a voltage drop VDSSR of the synchronous switch 208 is zero, wherein a direction of a current IDSSR of the secondary side SEC of the flyback power converter 200 can be referred to FIG. 3. In addition, because the primary side PRI of the flyback power converter 200 and the secondary side SEC of the flyback power converter 200 do not operate simultaneously, meanwhile the primary controller 202 disables a gate control signal VGSSW for the power switch 206 and a current IDSSW of the primary side PRI of the flyback power converter 200 is zero, wherein a voltage drop VDSSW of the power switch 206 is determined by equation (1):

$$VDSSW=VIN+N*(VOUT) \quad (1)$$

As shown in equation (1), VOUT is an output voltage of the secondary side SEC of the flyback power converter 200. In addition, between the time T0 and the time T1, the flyback power converter 200 can transfer energy of the primary side winding 210 of the flyback power converter 200 to the secondary side SEC of the flyback power converter 200.

Figure 5:
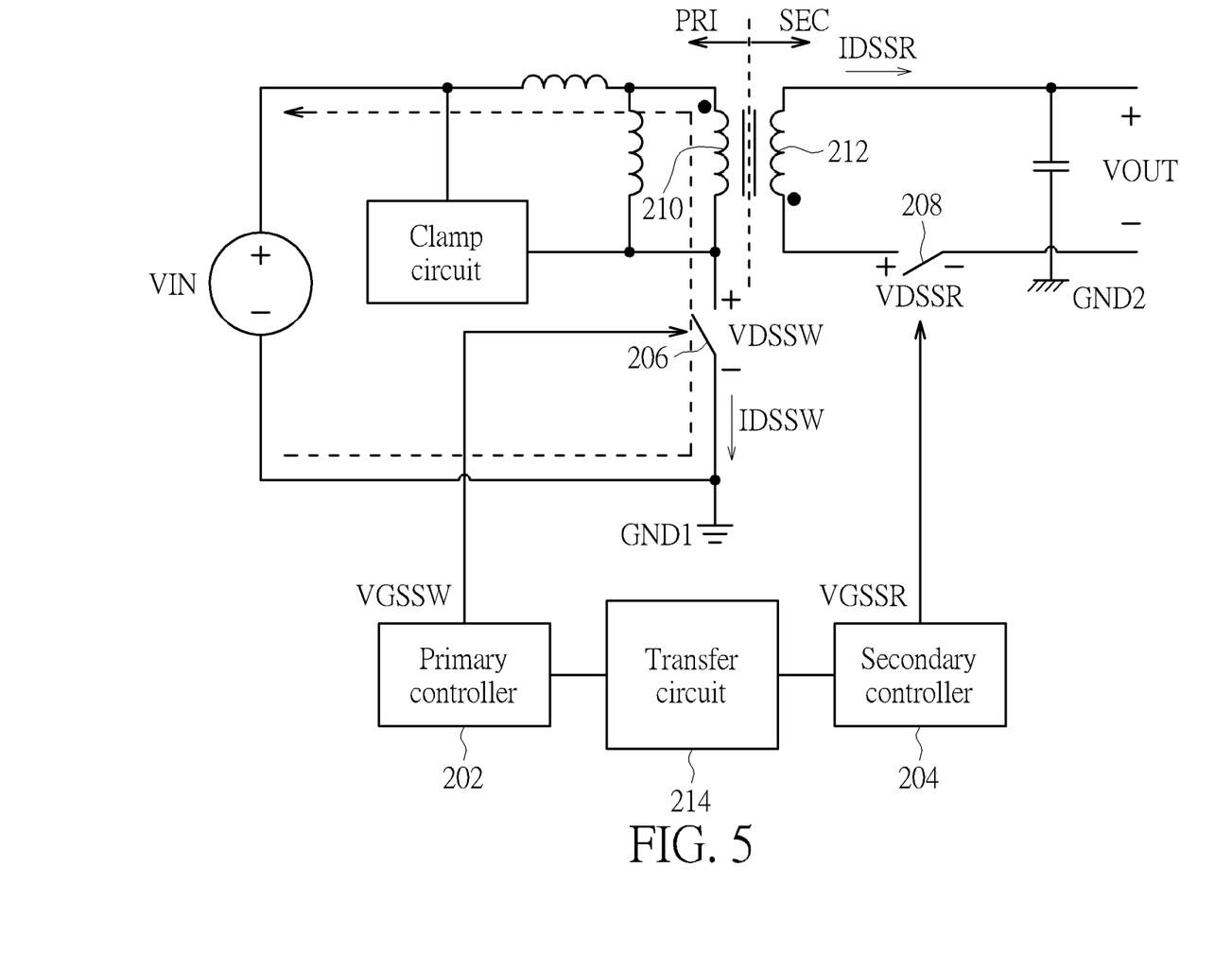

As shown in FIGS. 4, 5, between the time T1 and a time T2, although the primary controller 202 does not enable the gate control signal VGSSW for the power switch 206, meanwhile the current IDSSW of the primary side PRI can flow through a parasitic diode (not shown in FIG. 5) of the power switch 206, so the voltage drop VDSSW of the power switch 206 is gradually reduced to zero and the voltage drop VDSSR of the synchronous switch 208 starts to be gradually increased until (VIN/N)+VOUT, wherein a direction of the current IDSSW of the primary side PRI can be referred to FIG. 5. In addition, as shown in FIGS. 4, 5, between the time T1 and the time T2, the flyback power converter 200 can recycle the energy of the primary side winding 210 of the flyback power converter 200 to a grounded capacitor (not shown in FIG. 5) coupled to the primary side PRI of the flyback power converter 200.

As shown in FIGS. 4, 6, between the time T2 and a time T3, the primary controller 202 enables the gate control signal VGSSW to the power switch 206, and meanwhile the current IDSSW of the primary side PRI can flow through the power switch 206, so the voltage drop VDSSW of the power switch 206 is zero and the voltage drop VDSSR of the synchronous switch 208 is (VIN/N)+VOUT, wherein the direction of the current IDSSW of the primary side PRI can be referred to FIG. 6. In addition, because the primary side PRI of the flyback power converter 200 and the secondary side SEC of the flyback power converter 200 do not operate simultaneously, meanwhile the secondary controller 204 disables the gate control signal VGSSR for the synchronous switch 208. In addition, between the time T2 and the time T3, the flyback power converter 200 can transfer the energy of the primary side winding 210 of the flyback power converter 200 to the secondary side winding 212 of the flyback power converter 200.

As shown in FIGS. 4, 7, between the time T3 and a time T4, the secondary controller 204 enables the gate control signal VGSSR to the synchronous switch 208, and meanwhile the current IDSSR of the secondary side SEC can flow through the synchronous switch 208, so the voltage drop VDSSR of the synchronous switch 208 is zero and the voltage drop VDSSW of the power switch 206 is VIN+(N*VOUT), wherein the direction of the current IDSSR of the secondary side SEC can be referred to FIG. 7. In addition, because the primary side PRI of the flyback power converter 200 and the secondary side SEC of the flyback power converter 200 do not operate simultaneously, meanwhile the primary controller 202 disables the gate control signal VGSSW. In addition, between the time T3 and the time T4, the flyback power converter 200 can transfer energy of the secondary side winding 212 of the flyback power converter 200 to a load (not shown in FIG. 7) coupled to the secondary side SEC of the flyback power converter 200.

In addition, switching loss PSW and conduction loss PCON of the power switch 206 can be determined by equation (2) and equation (3), respectively:

$$PSW=\tfrac{1}{2} \times COS\ S \times VDSSW^2 \times FSW \quad (2)$$

$$PCON = RDSSW(ON) \times IDSSW(RMS)^2 \quad (3)$$

As shown in equation (2), COS S is a parasitic capacitor of the power switch 206, the voltage drop VDSSW is VINMAX−N*(VOUT+VF) when the flyback power converter 200 operates in the quasi-resonant mode, VINMAX is a maximum of the input voltage VIN, VF is a voltage drop of a parasitic diode of the synchronous switch 208, the voltage drop VDSSW is zero when the flyback power converter 200 operates in the zero voltage switching mode, and FSW is the operational frequency of the flyback power converter 200. In addition, because the voltage drop VDSSW is zero when the flyback power converter 200 operates in the zero voltage switching mode, according to equation (2), the switching loss PSW of the power switch 206 is zero when the flyback power converter 200 operates in the zero voltage switching mode. In addition, as shown in equation (3), RDSSW is a conduction resistor of the power switch 206, and IDSSW(RMS) is an effective value of the current IDSSW of the primary side PRI.

In addition, switching loss PSWSRAUX and conduction loss PCONSRAUX of the synchronous switch 208 when the flyback power converter 200 operates in the zero voltage switching mode can be determined by equation (4) and equation (5), respectively:

$$PSWSRAUX = \frac{1}{2} \times COSSSR \times VDSSR^2 \times FSW \quad (4)$$

$$PCON\,SRAUX = RDSSR(ON) \times \left( \sqrt{\frac{DAUX}{3}} \times IDSSRMAX \right)^2 \quad (5)$$

As shown in equation (4), COS SSR is a parasitic capacitor of the synchronous switch 208, the voltage drop VDSSR is between 0~2*VOUT. In addition, as shown in equation (5), RDSSR(ON) is a conduction resistor of the synchronous switch 208, IDSSRMAX is a maximum of the current IDSSR of the secondary side SEC, and DAUX is conduction time of the synchronous switch 208.

As shown in FIG. 8, under a condition that the input voltage VIN is 264V and an operational frequency FSW of the flyback power converter 200 is between 20 kHz~100 kHz, the loss PZVS of the flyback power converter 200 corresponding to the zero voltage switching mode and the loss PQR of the flyback power converter 200 corresponding to the quasi-resonant mode can be calculated according to equation (2)~equation (5), wherein when the operational frequency FSW of the flyback power converter 200 is greater than a predetermined frequency PF (e.g. 25 kHz), the flyback power converter 200 should operate in the zero voltage switching mode to make efficiency of the flyback power converter 200 be better.

As shown in FIG. 9, after the input voltage VIN is greater than the predetermined voltage PV (e.g. 150V), the loss PZVS of the flyback power converter 200 corresponding to the zero voltage switching mode is less than the loss PQR of the flyback power converter 200 corresponding to the quasi-resonant mode. Therefore, after the input voltage VIN is greater than the predetermined voltage PV, the flyback power converter 200 should operate in the zero voltage switching mode to make efficiency of the flyback power converter 200 be better.

In Step 104, if the number LCRVN is greater than the predetermined number, it means that the load coupled to the secondary side SEC of the flyback power converter 200 is light. In Step 106, the primary controller 202 can obtain the operational frequency FSW of the flyback power converter 200 according to the conduction time TON, the conduction time TDIS, and inductor capacitor resonant time corresponding to the number LCRVN. Therefore, in Step 104~Step 108, according to FIGS. 8, 9, it is very obvious that when the number LCRVN is greater than the predetermined number, the operational frequency FSW of the flyback power converter 200 is less than the predetermined frequency PF (it also means that the load coupled to the secondary side SEC of the flyback power converter 200 is light), and the input voltage VIN is less than the predetermined voltage PV, the primary controller 202 can control the flyback power converter 200 to operate in the quasi-resonant mode to make the efficiency of the flyback power converter 200 be better.

In addition, in Step 104~Step 108, according to FIGS. 8, 9, it is also very obvious that when the number LCRVN is less than the predetermined number (it means that the load coupled to the secondary side SEC of the flyback power converter 200 is heavy), or the operational frequency FSW of the flyback power converter 200 is greater than the predetermined frequency PF (it also means that the load coupled to the secondary side SEC of the flyback power converter 200 is heavy), or the input voltage VIN is greater than the predetermined voltage PV, the primary controller 202 can control the flyback power converter 200 to operate in the zero voltage switching mode to make the efficiency of the flyback power converter 200 be better.

Figure 10:
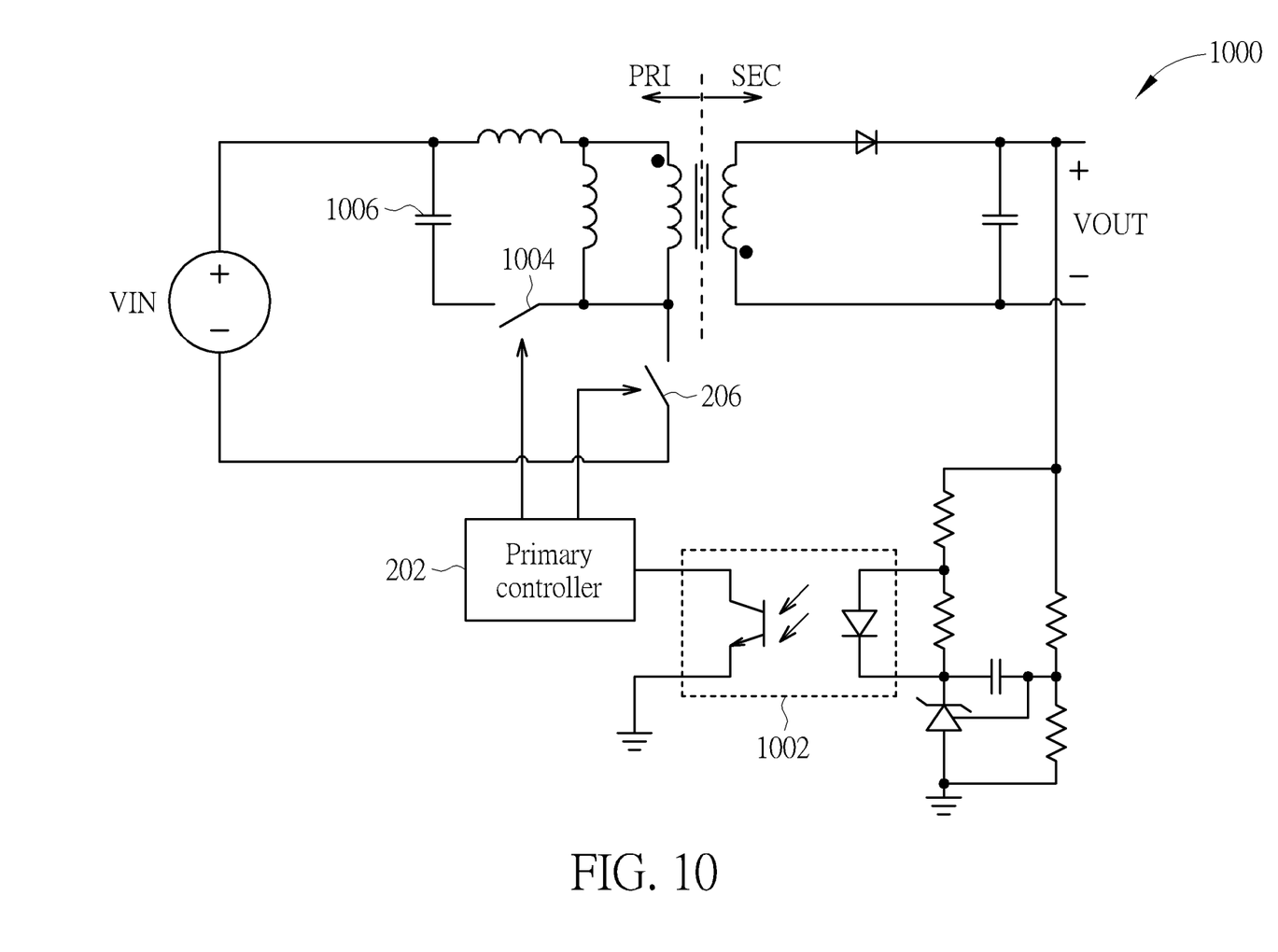
FIG. 10 is a diagram illustrating the flyback power converter and the primary controller.

In addition, in another embodiment of the present invention, the control method in FIG. 1 is also applied to an active clamp flyback power converter 1000 (as shown in FIG. 10), wherein as shown in FIG. 10, a photocoupler 1002 isolates a primary side PRI of the active clamp flyback power converter 1000 from a secondary side SEC of the active clamp flyback power converter 1000. In addition, as shown in FIG. 10, a function of a switch 1004 can be referred to a function of the synchronous switch 208 of the flyback power converter 200, and a function of a clamp capacitor 1006 can be referred to a function of a clamp circuit of the flyback power converter 200. In addition, one of ordinary skilled in the art should know operational principles of the active clamp flyback power converter 1000, so further description thereof is omitted for simplicity.

To sum up, the control method of the flyback power converter controls the flyback power converter to switch between the quasi-resonant mode and the zero voltage switching mode according to the conduction time of the power switch of the primary side of the flyback power converter detected by the voltage detection pin of the primary side controller, the conduction time of the synchronous switch of the secondary side of the flyback power converter detected by the feedback pin of the primary side controller, the number of the inductor capacitor resonant valleys detected by the feedback pin of the primary side controller when the flyback power converter operates in the discontinuous conduction mode, and the input voltage inputted in the flyback power converter detected by the high voltage detection pin of the primary side controller. Therefore, compared to the prior art, because the present invention can control the flyback power converter to switch between the quasi-resonant mode and the zero voltage switching mode, the present invention can make the efficiency of the flyback power converter be better.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A control method of a flyback power converter, comprising:
   a voltage detection pin detecting conduction time of a power switch of a primary side of the flyback power converter, a feedback pin detecting conduction time of a synchronous switch of a secondary side of the flyback power converter, the feedback pin detecting a number of inductor capacitor resonant valleys when the flyback power converter operates in a discontinuous conduction mode (DCM), and a high voltage detection pin detecting an input voltage inputted in the flyback power converter; and
   a controller applied to the flyback power converter making the flyback power converter operate in a quasi-resonant mode when the number of the inductor capacitor resonant valleys is greater than a predetermined number, an operational frequency of the flyback power converter is less than a predetermined frequency, and the input voltage is less than a predetermined voltage.

2. The control method of claim 1, wherein when the number of the inductor capacitor resonant valleys is less than the predetermined number, the controller makes the flyback power converter operate in a zero voltage switching mode.

3. The control method of claim 1, wherein when the operational frequency of the flyback power converter is greater than the predetermined frequency, the controller makes the flyback power converter operate in a zero voltage switching mode.

4. The control method of claim 1, wherein when the input voltage is greater than the predetermined voltage, the controller makes the flyback power converter operate in a zero voltage switching mode.

5. The control method of claim 1, wherein the flyback power converter is a secondary side regulation flyback power converter.

6. The control method of claim 1, wherein the flyback power converter is an active clamp flyback power converter.

7. The control method of claim 1, wherein the controller has 6 pins, and the 6 pins at least comprises the voltage detection pin, the feedback pin, and the high voltage detection pin.

* * * * *